United States Patent [19]

Mattern et al.

[11] Patent Number: 4,732,261

[45] Date of Patent: Mar. 22, 1988

[54] METHOD AND APPARATUS FOR ASSEMBLING AND FORWARDING SETS OF SHEETS

[75] Inventors: Gerd Mattern, Linden; Franz-Georg Immerschitt, Hüttenberg, both of Fed. Rep. of Germany

[73] Assignee: Bell & Howell Company, Chicago, Ill.

[21] Appl. No.: 769,047

[22] Filed: Aug. 26, 1985

[30] Foreign Application Priority Data

Jul. 22, 1985 [DE] Fed. Rep. of Germany ....... 3526136

[51] Int. Cl.⁴ ............................................. B65G 47/26
[52] U.S. Cl. .................................... 198/422; 198/460;
 198/572; 198/718; 198/857; 198/575
[58] Field of Search ............... 198/422, 718, 721, 460,
 198/572, 575, 606, 857; 270/45, 51, 58;
 271/199, 213, 272, 273, 274; 414/43, 46, 52

[56] References Cited

U.S. PATENT DOCUMENTS

| | | | |
|---|---|---|---|
| 2,974,360 | 3/1961 | Giles | 198/606 |
| 3,193,081 | 7/1965 | Harrison et al. | 198/572 |
| 3,620,139 | 11/1971 | Kulwicki | 198/721 |
| 3,880,059 | 4/1975 | Brockmuller | 198/422 |
| 3,995,735 | 12/1976 | Risley | 198/572 |
| 4,182,443 | 1/1980 | Pongracz | 198/460 |
| 4,227,607 | 10/1980 | Malavenda | 198/857 |
| 4,273,319 | 6/1981 | Stocker | 270/21.1 |
| 4,456,127 | 6/1984 | Hams | 209/564 |
| 4,502,676 | 3/1985 | Stocker | 270/45 |

FOREIGN PATENT DOCUMENTS

| | | | |
|---|---|---|---|
| 2436051 | 2/1976 | Fed. Rep. of Germany | 270/58 |
| 52-66270 | 6/1977 | Japan | 198/460 |
| 2140380 | 11/1984 | United Kingdom | 198/460 |
| 385859 | 7/1973 | U.S.S.R. | 198/460 |

Primary Examiner—Robert J. Spar
Assistant Examiner—D. Glenn Dayoan

[57] ABSTRACT

At least three storage devices (6,7,8) are serially arranged between an entrance station (1) and a processing station. Transfer devices are disposed between adjacent storage devices and between a last storage device and the processing station. The transfer devices are operated independently of each other, a given transfer device being operated whenever both a storage device which precedes the given transfer device in the direction of travel of the sets of sheets is occupied and a storage device which succeeds the given transfer device in the direction of travel of the sets of sheets is ready to receive a set of sheets.

8 Claims, 4 Drawing Figures

| | First Storage Device | Second Storage Device | Third Storage Device | Fourth Storage Device | Fifth Storage Device | |
|---|---|---|---|---|---|---|
| 1 → | Set 1 | | | | | |
| 3 → | Set 2 | | | | Set 1 | |
| 3 → | Set 2 | | | | Set 1 | |
| 3 → | Set 2 | | | | | → Set 1 |
| 1 → | Set 3 | | | | Set 2 | |
| 1 → | Set 4 | | | Set 3 | Set 2 | |
| 1 → | Set 5 | | | Set 4 | Set 3 | → Set 2 |
| 1 → | Set 6 | | Set 5 | Set 4 | Set 3 | |
| 3 → | Set 7 | Set 6 | Set 5 | Set 4 | Set 3 | |
| 3 → | Set 7 | | Set 6 | Set 5 | Set 4 | → Set 3 |
| 3 → | Set 7 | | Set 6 | Set 5 | Set 4 | |
| 2 → | Set 8 | Set 7 | Set 6 | Set 5 | Set 4 | |
| 2 → | Set 8 | | Set 7 | Set 6 | Set 5 | → Set 4 |
| | | | | | | |
| | | | | | | |

FIG. 4

METHOD AND APPARATUS FOR ASSEMBLING AND FORWARDING SETS OF SHEETS

BACKGROUND OF THE INVENTION

I. Field of the Invention

This invention relates to methods and apparatus for assembling and forwarding sets of superimposed form sheets, and particularly sets of form sheets which are assembled from form sheets which have been individually and cyclically delivered by an entrance station. The entrance station comprises sensing means for detecting marks provided on the form sheets and for indicating in accordance with the detection of such a mark on a given form sheet that the form sheet belongs to a predetermined set of form sheets. The sets of form sheets are forwarded to downstream processing means at a predetermined cycle frequency. Receiving stations comprising storage devices are provided between the entrance station and the processing means. As used herein, the term "form sheets" describes any paper sheets which are adapted to be assembled in a set thereof and which differ in any feature which can be detected by sensing or scanning.

II. Prior Art and Other Consideraations

Apparatus of the kind described hereinbefore is known from U.S. Pat. No. 4,456,127 (incorporated herein by reference) and comprises two storage devices which are serially arranged in the direction of travel of the sets of form sheets. The individual form sheets are consecutively delivered to the first storage device by an entrance station (which comprises a cutting device). The sets of form sheets are collected in the second storage device and are then forwarded to processing means such as a conveyor or enveloping chain. Because the individual form sheets are temporarily stored in the storage device which directly succeeds the entrance station, the sets of form sheets can be properly assembled even when the forwarded sheets belong to a new set of form sheets (as belateldy indicated by the sensing or scanning means in the entrance station since the operation of the entrance station cannot be interrupted in time before a form sheet belonging to the new set of form sheets leaves the entrance station). In such case the form sheet which belongs to the new set of form sheets can remain in the first storage device until the preceding set of form sheets collected in the second storage device has left that second storage device and has been delivered to the processing means.

If in apparatus of the type described above the cycle frequencies of the entrance station and of the processing means differ greatly, and if the sets of form sheets are composed of different numbers of sheets, and if the cyclic operations of the entrance station and of the processing means are not synchronized, either the operation of the entrance station and/or the processing means must be interrupted. Interruption of operation becomes necessary either because the entrance station is at least temporarily unable to deliver the form sheets at a rate which is sufficient to permit a continuous operation of the processing means, or because the processing means is at least temporarily unable to receive and process the assembled sets of form sheets at a rate which is sufficient to permit a continuous operation of the entrance station.

In view of the foregoing, it is an object of the present invention to provide method and apparatus of the general kind described hereinbefore which facilitates continuous operation of the entrance station and of the processing means even when sets of widely differing numbers of form sheets are being handled.

SUMMARY

At least three storage devices for storing sets of form sheets are arranged one behind the other (i.e. serially) in the direction of travel of the sets of form sheets through the apparatus. A transfer device is provided between every two adjacent ones of the storage devices and between the last storage device and processing means. The transfer devices are operable independently of each other. Each transfer device is operated when the storage device which precedes it in the direction of travel is occupied by a set of form sheets and the storage device which succeeds it in the direction of travel (or alternatively a receiving station of the processing means) is empty or adapted to receive a set of form sheets.

In one embodiment the entrance station comprises a cutting device for cutting the form sheets from a sheet web. In other embodiments the entrance station comprises a sheet feeder for feeding consecutive individual form sheets from a stack thereof. In yet other embodiments the entrance station comprises folding stations or the like.

The cascade storage arrangement of the apparatus described herein serves as a buffer for effecting a temporary storage of the sets of form sheets in such a manner that a supply of sets of form sheets required for a continuous filling of all receiving stations of the processing means at the cycle frequency thereof will be available. Because that supply does not utilize the entire storage capacity of the cascade storage arrangement at least for considerable periods of time, a free storage space for receiving new sets of form sheets from the entrance station is always available in the several storage devices so that the free storage space directly succeeding the entrance station ensures that each set of form sheets will be removed from the entrance station regardless of whether the entrance station is delivering sets composed of a few form sheets at a high rate or is delivering sets composed of a large number of form sheets at a low rate.

Each transfer device comprises drive belts, particularly cogged belts adapted to be intermittently driven by separate drive means. The cogged belts each carry flights and each have an upper course which extends approximately in the plane of a supporting surface of the storage devices. Each transfer device also comprises friction wheels which are adapted to be intermittently driven and which have apex portions protruding above the plane of the supporting surface. Each transfer device further comprises belt pulley assemblies disposed opposite the friction wheels and biased against the friction wheels. Entraining belts are trained around the belt pulley assemblies. The intermittent drive is effected whereby drive motors are continuously operated and whereby a solenoid clutch (connected between the drive motors and shafts carrying the driving belt pulleys and the friction wheels) is selectively energized and deenergized.

In a preferred embodiment, each storage device has an occupation detector circuit associated therewith which particularly comprises a photocell arranged in the supporting surface of the storage device proximate the receiving end of the supporting surface. The transfer devices such as that provided between the second and third storage devices and such as those provided before any succeeding storage device are controlled in that the output signals of the occupation detector circuits of adjacent storage devices are logically combined.

For control of the transfer device provided between the first and second storage devices in the direction of travel of the form sheets, a signal derived from the sensing means of the entrance station is used to indicate the completeness of a set of form sheets in the first storage device. This completeness signal is logically combined with a signal from the occupation detector circuit of the second storage device.

The free storage capacity which is available in the cascade storage arrangement is monitored whereby a piling of sets consisting of a small number of form sheets is prevented. To this end a bidirectional counter is provided and is incremented in response to a signal delivered by the sensing means of the entrance station to indicate the presence of a complete set of form sheets in the first storage device. The bidirectional counter is decremented in response to a signal indicating the forwarding of a set of sheets to the processing means. The entrance station is arranged to be stopped by an output signal delivered by the counter when its count is equal to the number of storage devices included in the cascade arrangement.

The proper transfer of the sets of form sheets and, in special cases, the proper transfer of individual form sheets, from one storage device to the next is suitably monitored by a storage device monitor circuit provided between every pair of adjacent storage devices. Each storage device monitor circuit comprises a bidirectional counter which is incremented in response to the output signal of the occupation detector circuit of the next preceding storage device and which is decremented in response to the output signal of the occupation detector of the next succeeding storage device. The bidirectional counter of the monitor circuit disables the system when its count exceeds one or is smaller than zero.

In some embodiments, the entrance station includes a receiving station which precedes the cascade storage arrangement and which serves to receive individual form sheets. The entrance station can also include a transfer device for forwarding individual form sheets from the receiving station and for causing the form sheets to be collected in a set of form sheets in the first storage device, whereby the receiving station preceding the cascade storage arrangement is used for a temporary storage of such form sheets which may have been delivered by a sheet feeder or a cutter or the like toward the cascade arrangement when the sensing means of the entrance station have indicated that said form sheet does not belong to the previously collected set of form sheets but to a new set of form sheets.

If the entrance station delivers form sheets in two juxtaposed parallel rows, systems of the kind described herein comprise two parallel cascade arrangements, each arrangement comprising a series of storage device and delivering sets of form sheets to common forwarding means comprising, for example, an elveloping chain extending transversely to the cascade storage arrangements.

The apparatus described herein permits an increase in the operating rate of, for example, a automatic serial mailing system. In such a system a number of processing stations are disposed between a cutting station (which serves the form sheets for a continuous sheet web) and a processing means (comprising, for example, an enveloping chain or even a folding mechanism). The increase of the operating rate is due to the fact that the severing of the form sheets for a succeeding set of form sheets need not be delayed until a preceding set of form sheets has been completely collected or received by a storage device which directly precedes the processing means. Rather, the form sheets are made virtually in stock in the entrance station and are collected in sets of form sheets at the beginning of the cascade storage arrangement whereby sets of form sheets are available in a changing number at the end of the cascade arrangement and can be delivered to the processing means.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
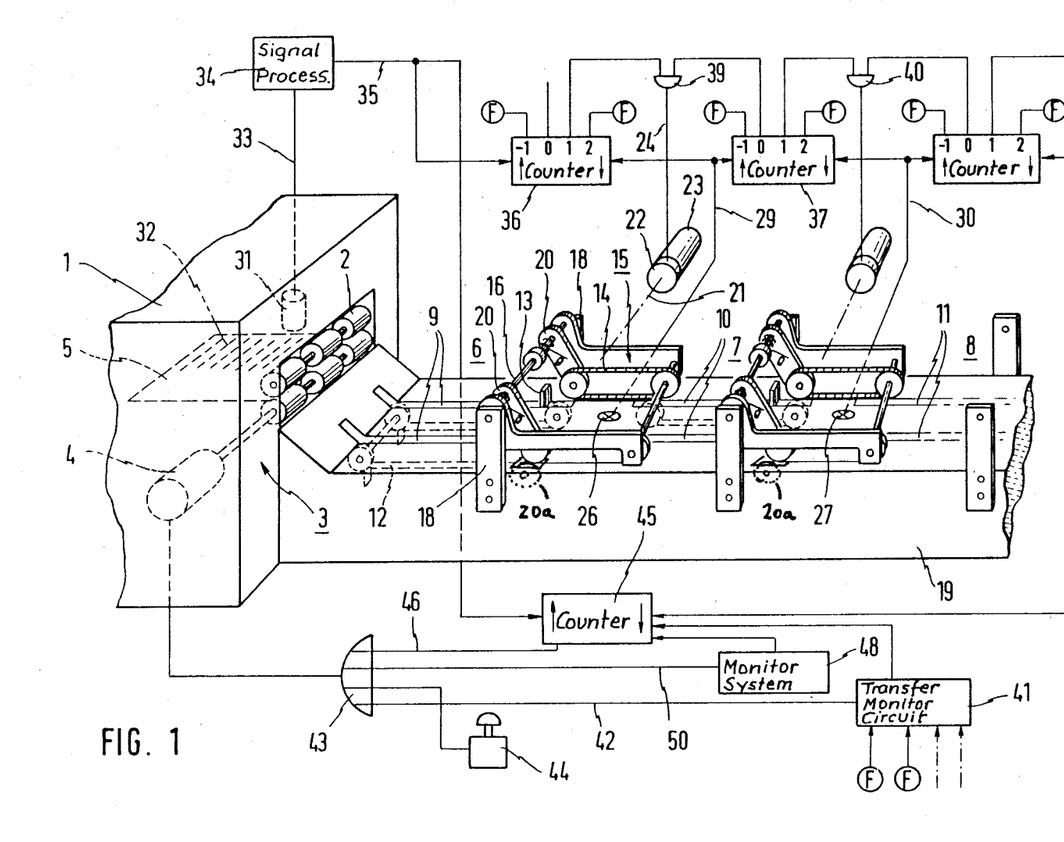
FIG. 1 is a diagrammatic fragmentary perspective view showing apparatus for assembling and forwarding sets of form sheets and a simplified block circuit diagram thereof.

The automatic serial mailing system of FIG. 1 comprises an entrance station 1. Although not specifically illustrated as such in FIG. 1, in differing embodiments the entrance station 1 comprises a sheet feeder or a cutter for cutting form sheets from a continous sheet web. A conveyor 3 comprises sets of mutually opposite pinch rollers 2 and is cyclically operable by means of a drive motor 4 for delivering individual form sheet 5 from the entrance station 1 to a cascade arrangement of consecutive storage devices 6, 7, 8, etc. Only three of said storage devices are shown in FIG. 1 although a larger number of such storage devices may be provided in practice.

The storage devices 6, 7, 8, etc have longitudinally extending, parallel apertures or slots 9, 10, 11, etc. provided in their supporting surfaces. The upper courses of cogged conveyor belts 12 protrude through the slots 9, 10, 11, etc. As is apparent from FIG. 1, the belts are trained around pulleys. Each belt 12 carries a first flight 13 which, in a predetermined rest position of the cogged conveyor belts 12, is disposed at the delivery end of the respective supporting surface and acts as a stop for the incoming form sheets or sets thereof. Each cogged conveyor belt 12 is provided with a second flight which, in the next position of belt 12, is disposed below the supporting surface of the storage device. When the cogged conveyor belts have been started, the second flights are moved around the pulleys which are nearer to the entrance station so that the second flights subsequently protrude from the supporting surface of the storage device and any set of form sheets or single form sheet disposed on the supporting surface is pushed by the second flights to the next succeeding storage device or, in the case of the last storage device, into the processing means.

It is apparent that the cogged conveyor belts 12 are included as a component of transfer devices which are associated with the storage devices. The transfer devices also comprise friction wheels 20a which protrude from apertures formed in the supporting surfaces of the storage devices beside the longitudinal apertures 9, 10, 11, etc. The friction wheel 20a, which are trained around pairs of pulleys and are laterally offset from the cogged conveyor belts 12 as seen from above, cooperate with entraining belts 14.

For each pulley pair about which belts 14 are entrained, the pulleys which are remote from the entrance station 1 are mounted on an axle provided between spaced-apart arms at a free end of a pivoting frame 15. A plurality of pivoting frames 15 are provided, each frame 15 being included in a corresponding transfer device. Each frame 15 is pivoted on a pivot 16 and is biased toward the supporing surface of the next succeeding storage device. The pivot 16 is supported by brackets 17 and 18, which are laterally secured to a housing or carrying frame 19 in the manner shown in FIG. 1.

Links 20 are also pivoted to the pivot 16. For each pulley pair about which belts 14 are entrained, the pulleys which are nearer the entrance station 1 are rotatably mounted at the depending free ends of the links 20. The links 20 are biased in the clockwise sense in FIG. 1 by coil springs. In this regard, the biasing coil springs surround the pivot 16 and bear against collars thereon. As a result, the entraining belts 14 are tensioned between the pulleys comprising the pulley pair around which they are trained.

The friction wheels 20a which cooperate with respective entraining belts 14 are substantially disposed inside the housing 19. In the embodiment shown in FIG. 1 the friction wheels are substantially disposed under the pulleys which are rotatably mounted on the links 20. The friction wheels 20a rotatably connected to a shaft 21. Shaft 21 is also the shaft upon which are mounted the pulleys for the cogged conveyor belts 12 which are nearer to the entrance station 1.

As shown in FIG. 1, shaft 21 is connected to a solenoid clutch 22. Solenoid clutch 22 is responsively connected to a drive motor 23 by a line 24. Drive motor 23 is normally in continual operation.

Each of the storage devices 6, 7, 8, etc has associated therewith a transfer device comprising a pair of cogged conveyor belts 12 and a set of entraining belts 14 and associated friction wheels. Although FIG. 1 shows the transfer device associated with each storage device as having an entraining belt set comprising two entraining belts 14, it should be understood that sets comprising three or more entraining belts and associated friction wheels can be employed. The transfer devices are, in one embodiment, identical for each storage device so that their manufacture is simplified and less expensive.

Excepting the upstream-most storage device 6, each of the storage devices 7, 8 is provided with a photodetector at the end of its supporting surface that is nearer to the entrance station. In this regard, FIG. 1 shows the photodetectors 26 and 27 associated with the storage devices 7 and 8, respectively. The photodetectors 26, 27 are constituent parts of detector circuits and deliver a control signal via signal lines 29 or 30, respectively when the trailing edge of a form sheet or set of form sheets moves over the photodetector.

The entrance station 1 includes sensing means comprising a code reader 31 for reading code marks 32 provided on each form sheet 5 and for indicating by signals delivered via a signal line 33 whether a given form sheet still belongs to the previously assembled set of form sheets or is the first form sheet for the next set of form sheets.

A signal processor 34 is electrically connected by the line 33 to the code reader 31. In the signal processor 34, the signals delivered by the code reader 31 in repsonse to the traverse of a form sheet are compared with the signals delivered in response to the preceding form sheet so that a signal indicating the detection of the first form sheet for a new set of form sheets is applied to a processor output line 35.

The signals which are derived from the photodetectors of adjacent storage devices which succeed the storage device 6 (i.e., the storage devices which are downstream from storage device 6) are delivered to a bidirectional counter. For instance, the signal derived from the photodetector 26 is delivered via a signal line 29 to the incrementing input of the bidirectional counter 37 and the signal derived from the photodetector 27 is delivered via a line 30 to the decrementing input of the counter 37. Each other pair of photodetectors associated with adjacent storage devices are associated with another bidirectional counter. The decrementing input of the bidirecitonal counter 36 is connected to the signal line 29 from the photodetector 26. However, since storage device 6 is the upstream-most storage device, the incrementing input of the counter 36 is connected to the output line 35 from the signal processor 34.

Thus, in view of the foregoing, whenever a set of form sheets enters one of the storage devices 7, 8, etc., the bidirectional counter associated with that storage device (and which also happens to also be associated with the next succeeding storage device) is incremented. Whenever a set of form sheets leaves a storage device, the associated counter is decremented. As a result, when sets of form sheets are properly conveyed through the storage devices 7, 8, etc., the count of each of said counters will change between "zero" (which indicates that the storage device is "empty") and "one" (which means that the storage device is "occupied"). A count of 2 or −1 will indicate a malfunction.

Because the sets of form sheets are assembled from individual form sheets in the first storage device 6 of the cascade arrangement, the incrementing of the counter 36 cannot be controlled by a photodetector which is arranged at the receiving end of the supporting surface of the storage device 6. Instead, for the first storage device 6 incrementing of counter 36 is effected by signals delivered on the line 35 to indicate the completion of a set of form sheets. The counter 36 is decremented in response to signals on line 29.

When the storage device 6 contains a complete set of form sheets, the counter 36 has a count of one and is connected to apply a logical true signal from a "one" count output pin of counter 36 to a first input terminal of AND gate 39. A second input terminal of AND gage is connected to a "zero" count output pin of the counter 37. At this point the counter 37 indicates a count of zero because the storage device 7 is empty. The logical false output signal from the AND gate 39 causes the solenoid clutch 22 to be energized for a predetermined time so that the cogged conveyor belts 12 and the friction wheels as well as the associated entraining belts 14 are moved a predetermined distance to transfer the set of form sheets from the storage device 6 to the storage device 7.

As the set of form sheets is transferred from storage device 6 to storage device 7 the photodetector 29 is covered and then uncovered. As the trailing edge of the set of form sheets uncovers photodetector 29, a signal is applied on line 29 to increment counter 37 and to decrement counter 36. If another set of form sheets is not contained at that time in the storage device 8 (meaning that the next bidirectional counter in the circuit has a count of zero), the set of form sheets which has just been transferred will be immediately forwarded to the storage device 8. In this regard, the transfer device provided between the storage devices 7 and 8 is operated by a solenoid clutch having corresponding drive means energized in response to an output signal of the AND gate 40. The AND gate 40 is connected in analogous manner as AND gate 39, and it is understood that under these circumstances that the AND gate 40 has a logical false output which energizes the solenoid clutch.

On the other hand, if the storage device 8 is occupied by a preceding set of form sheets at the time when a set of form sheets is being transferred from the storage device 6 to the storage device 7, then the set of form sheets contained in the storage device 7 must be kept therein until the preceding set of form sheets has left the storage device 8 (e.g. until that preceding set of form sheets has been transferred to an unillustrated downstream processing station).

It is apparent that the bidirectional counters 36, 37, etc. serve not only to control the intermittently operable transfer devices, but also permit a monitoring by which a proper transfer of the sets of form sheets is checked. When an improper transfer is indicated by a count of −1 or a count of 2, the corresponding counter will deliver via an error line F an error signal to a transfer monitor circuit 41. Upon receipt of an error signal the monitor circuit 41 delivers via line 42 and an input terminal of OR gate 43 an output signal for immediately stopping the drive means 4 of the entrance station 1.

Another input of the OR gate 43 is connected to a manually operable shutdown switch 44. A third input terminal of the OR gate 43 is connected by a signal line 46 to a bidirectional counter 45, which delivers a signal via the line 46 when the count of the counter 45 exceeds the number of storage devices of the cascade arrangement. For this purpose, the counter 45 has its incrementing input terminal connected to the signal line 35 so that the count in the counter 45 will be incremented whenever the code reader 31 indicates via the processor 34 that a complete set of form sheets has been assembled and the assembling of a new set of form sheets begins. In the present embodiment such signal of the processor 34 is equivalent to a signal which indicates the presence of a complete set of form sheets in the storage device 6.

The decrementing input of the counter 45 is connected via a signal line to a device which delivers a signal whenever a set of form sheets is delivered from the last storage device of the cascade arangement to the processing station by the associated transfer device. That signal is delivered to the counter 45 and initiates the operation of the drive means for the transfer device associated with the last storage device and is derived from a last AND gate (which is not shown in FIG. 1) and corresponds to the AND gates 39 and 40. The last AND gate is understood to have a first input terminal thereof connected to the "one" count output terminal of the last bidirectional counter of the counter series 36, 37 and a second input terminal thereof connected to a monitoring device for determining when the set has been delivered from the last storage station to the processing station.

Because the counter 45 is incremented whenever a set of form sheets enters the cascade storage arrangement and is decremented whenever a set of form sheets leaves the cascade arrangement, the count of the counter 45 will indicate the number of complete sets of form sheets which are contained in the cascade arrangement at any given time. When the counter 45 has a count that is equal to the number of storage devices of the cascade arrangement, the cascade arrangement is completely filled with sets of form sheets such that sets occupy all storage devices. In such circumstances entrance station 1 must not deliver form sheets for a new set thereof until the storage device which immediately succeeds the entrance station 1 is empty because a set of from sheets previously stored in the cascade arrangement have been advanced immediately thereafter. In order to avoid a malfunction before this has occurred, such a count of the counter 45 must have the effect that the entrance station 1 is stopped immediately by a signal delivered via the signal line 46 and the OR gate 43.

The circuit 41 cooperates with the counters 36, 37, etc. to monitor the proper transfer of sets of form sheets betwen the storage devices. In addition, a separate monitor circuit 47 is suitably associated with each of the storage devices 6, 7, 8, etc. and will now be explained more in detail with reference to FIG. 3. The number of monitor circuits 47 is equal in number to the number of storage devices combined in an overall monitor system 48. In monitor system 48 the outputs of the monitor circuits 47 are combined by means of an OR gate 49. The output of OR gate 49 is connected by a signal line 50 to yet another input terminal of the OR gate 43 so that the entrance station 1 will be stopped immediately in case of an improper storage.

Figure 3:
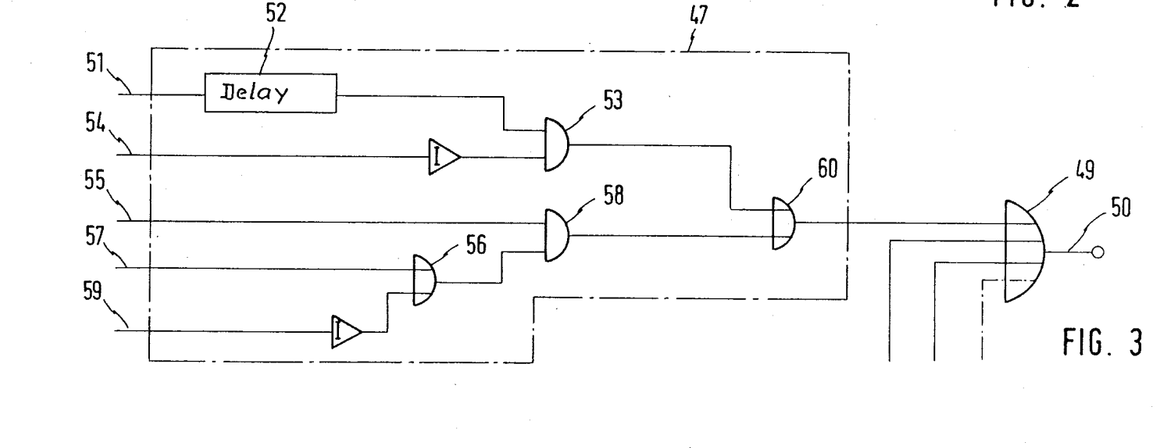
FIG. 3 is a circuit diagram of a device for monitoring the transfer between adjacent storage devices; and, FIG. 4 is a table indicating different operational states of a cascade arrangement of five storage devices of an embodiment of the apparatus described herein.

It is assumed that the monitor circuit 47 shown in FIG. 3 is associated with the storage device 7 in FIG. 1. An input line 51 of the circuit 47 is connected to the signal line 24 to receive a signal as soon as the transfer device preceding the storage device 7 has been started. By means of a delay line 52, the signal is delayed for a predetermined time and is then delivered to a first input terminal of an AND gate 53. A second input terminal of AND gate 53 receives via a line 54 the signal on line 29 after it has been inverted by means of an inverter. Thus, the second inputer terminal of the AND gate 53 will receive a logical true signal whenever the photodetector 26 does not indicate the traverse of a set of form sheets. As a result, the AND gate 53 will deliver an output signal whenever the arrival of a set of form sheets in the storage device 7 has not been indicated by the photodetectors 26 within a predetermined time as defined by the delay line 52 after the starting of the operations of the transfer device which precedes the storage device 7.

A line 55 of the circuit 47 is connected to the output line 29 which receives from the photodetector 26 the signal indicating the traverse of a set of form sheets. A line 57 connects a first input terminal of an OR gate 56 with a line to which the counter 37 delivers a logical true signal when counter 37 has a count of 1 (meaning that the storage device 7 is occupied). Line 55 and the output terminal of OR gate 56 are connected to first and second input terminals, respectively, of AND gate 58. For this reason the AND gate 58 will deliver an output signal when the photodetector 26 indicates the traverse of a set of form sheets when the storage device 7 is already occupied.

A second input terminal of the OR gate 56 is connected to an output terminal of an inverter. An input terminal of the inverter is connected to one end of a line 59. The other end of line 59 is connected to the output line 24 of the AND gate 39 shown in FIG. 1. As a result, the AND gate 58 will deliver a logical true output signal also when the photodetector 26 indicates by a logical true signal on line 29 the traverse of a set of form sheets although no signal indicating the starting of the operations of the transfer device which precedes the storage device 7 has been delivered via the line 24 and the line 29 with the inverter connected thereon.

The output terminals of the AND gates 53 and 58 are connected to respective input terminals of an OR gate 60. An output terminal of OR gate 60 is connected to the above-mentioned OR gate 49, which receives also the output signals of the other monitor circuits 47 associated with each of the other storage devices of the cascade arrangement.

Figure 2:
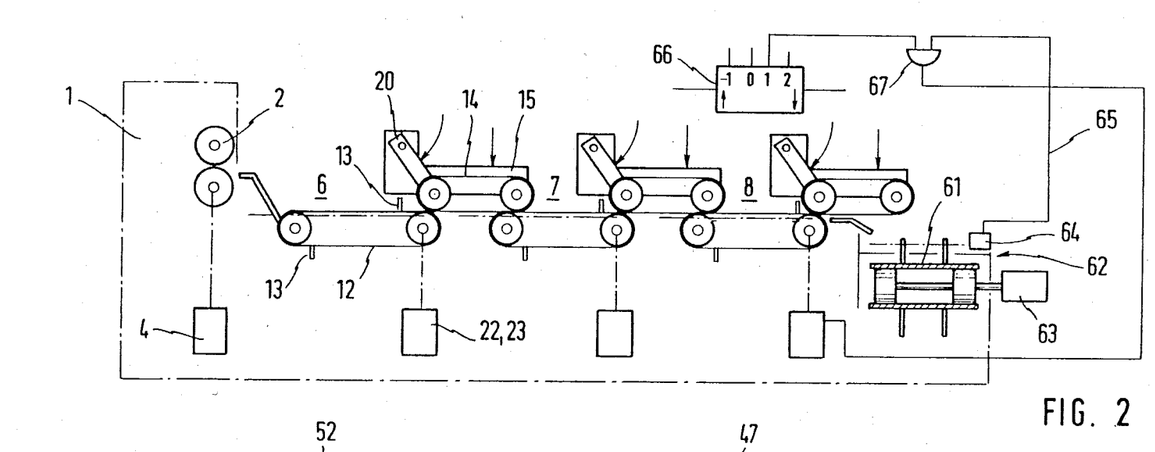
FIG. 2 is a diagrammatic side elevation shown an entrance station; a cascade storage arrangement provided with transfer device; and, processing means of apparatus of the kind described herein.

FIG. 2 is a diagrammatic side elevation showing a cascade arrangement including three consecutive storage devices. The transfer device which succeeds the storage device 8 delivers the sets of form sheets to a processing means, and in particular to an enveloping chain 61 of an enveloping line 62. Enveloping line 62 extends transversely to the direction of travel of the sets of form sheets through the cascade storage arrangement. The enveloping chain 61 is cyclically advanced by drive means 63. In one embodiment the cycle frequency of the enveloping chain 61 is, for instance, only one-half of the cycle frequency of the drive means 4 or the cycle frequency of a processing device in the entrance station 1. A position sensor 64 delivers a signal via a signal line 65 whenever the flights of the enveloping chain is ready to receive a set of form sheets.

The bidirectional counter 66 shown in FIG. 2 is associated with the storage device 8 exactly in the manner in which the counters 36 and 37 are associated with the storage devices 6 and 7, respectively, as has been described hereinbefore with reference to FIG. 1. The output signal delivered by the counter 66 to indicate the occupation of the storage device 8 is combined in an AND gate 67 with the signal delivered via line 65. The output signal of the AND gate 67 initiates the energization of the solenoid clutch of the drive means for operating the transfer device which succeeds the storage device 8. Whereas each of the transfer devices provided between adjacent storage devices is operated in dependence on the operation or state of the storage devices which respectively precede and succeed the transfer device in question, the last transfer device of the cascade arrangement is controlled in dependence on the operation or operational state of the next preceeding storage device and of the processing means.

Figure 4:
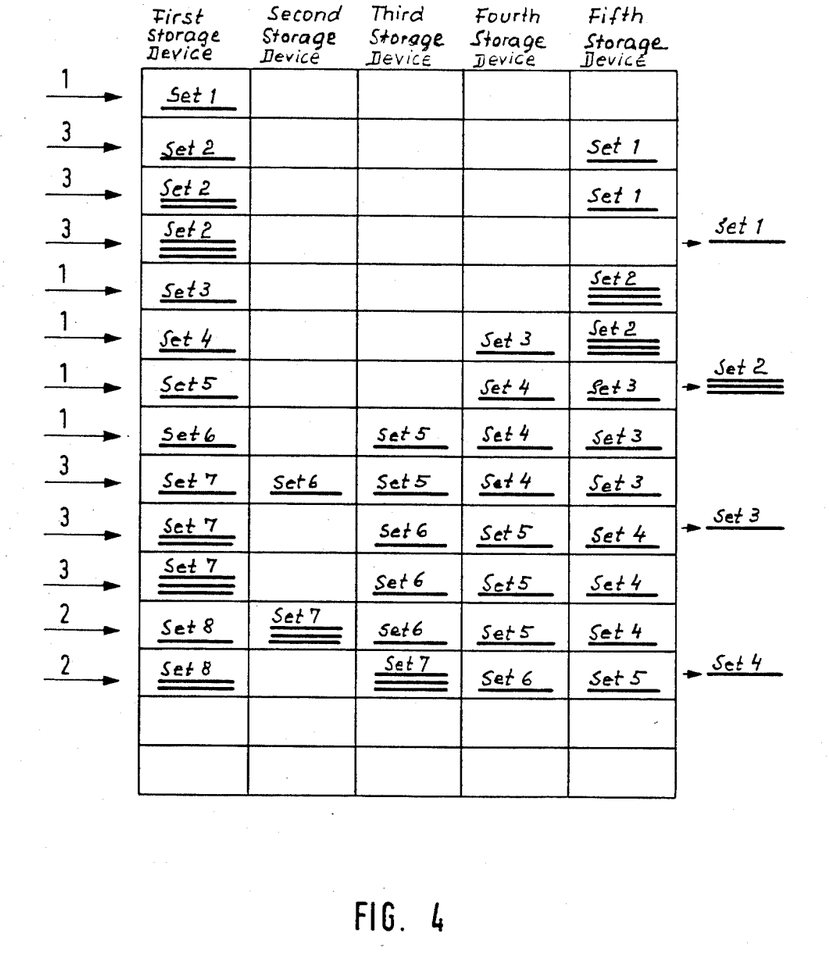

The graphical representation shown in FIG. 4 represents in its rows various instantaneous states of occupation of a cascade arrangement which is incorporated in a system of the present kind and comprises five storage devices. For example, the first sheet feed from entrance station 1 for set 2 (which will ultimately consist of 3 sheets) is fed at the time depicted by row 2; the second sheet for set 2 is fed at the time depicted by row 3, and the third sheet for set 2 is fed at the time depicted by row 4. From the bottom, the rows indicate occupational states assumed by the storage devices at consecutive times corresponding to the cyclical feeding of individual form sheets. The feeding of each form sheet is indicated on the left by an arrow, which is provided with a number indicating the number of sheets of the set of form sheets to which the form sheet belongs.

Small arrows on the right of the table indicate those rows which represent a forwarding of a set of form sheets to the processing means. It is apparent from FIG. 4 that the storage devices of the cascade arrangement will be filled up quickly from the delivery end of the cascade arrangement if each set of form sheets consists only of a few form sheets or of a single form sheet. On the other hand, when form sheets are to be collected in sets which each consist of a large number of form sheets, the processing means will be able to empty the cascade storage arrangement before a new set of form sheets has been completed. In the example shown in FIG. 4, the cycle frequency at which the form sheets are fed to the first storage device is an integral multiple of the cycle frequency at which the sets of form sheets are forwarded to the processing means. That frequency ratio is not essential because the operations of the entrance station and of the processing means need not be synchronized as the operations of the several transfer devices may be timed independently of each other.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An apparatus for assembling sets of sheets and for forwarding assembled sets of sheets to a processing station at a predetermined cycle frequency, said apparatus comprising:
   an entrance station including a receiving station which serves to receive individual form sheets;
   at least three storage devices serially arranged in a direction of travel of said sets between said entrance station and said processing station;
   means for feeding individual form sheets from said receiving station of said entrance station to a first of said storage devices, related ones of said form sheets being collectable in a set of form sheets at said first storage device;
   means for determining when all related form sheets belonging to a set of sheets has been fed from said entrance station into said first storage device;
   a plurality of first transfer means provided at least partially between adjacent ones of said storage devices for transferring sets of sheets in said direction of travel between said adjacent storage devices;
   second transfer means provided between said processing station and a storage device which precedes said processing station for transferring sets of sheets to said processing station;
   each of said first transfer means being independently and intermittently operable whereby a given one of said first transfer means is operated only when (1) the storage device which precedes said given transfer means in said direction of travel is occupied by a set of sheets, and (2) the storage device which succeeds said given transfer means in said direction of travel can receive a set of sheets; and, said second transfer means being independently operable whereby said second transfer means is operated when (1) the storage device which precedes said processing station is occupied by a set of sheets, and (2) said processing station can receive a set of sheets.

2. The apparatus of claim 1, wherein a storage device comprises a supporting surface, and wherein at least one of said plurality of said first transfer means and said second transfer means comprises:

a drive belt which carries flights thereon, said drive belt being intermittently driven whereby said drive belt has an upper course of travel extending proximate the plane of said supporting surface;

means for driving said drive belts;

a friction wheel mounted to have an apex portion thereof protruding above the plane of said supporting surface; and, a belt pulley assembly comprising a belt entrained around belt pulleys, said belt pulley assembly being disposed whereby said belt pulley assembly is biased against said friction wheel.

3. The apparatus of claim 2, wherein a given one of a pair of adjacent storage devices has an occupation monitor associated therewith, said occupation monitor comprising:

a presence detector disposed proximate the entrance of said given storage device;

a bidirectional counter associated with said given storage device, said bidirectional counter having:
(1) a first input terminal connected to said presence detector of said given storage device;
(2) a second input terminal connected to a presence detector of said storage device adjacent to said given storage device;
(3) an output terminal whereat an indication of the occupancy of said given storage device is provided; and, a logical gate, said logical gate having a first input terminal connected to said output terminal of said bidirectional counter associated with said given storage device and a second input terminal connected to an output terminal of a bidirectional counter associated with said storage device adjacent to said given storage devices, said logical gate further having an output terminal connected to means for effecting operation of one of said plurality of first transfer means provided between said adjacent storage devices.

4. The apparatus of claim 1, wherein the operation of one of said plurality of first transfer means which transfers sets of sheets in said direction of travel from a first storage device to a second storage device is controlled by a circuit which comprises:

a presence detector disposed proximate the entrance of said given storage device;

a bidirectional counter associated with said first storage device, said bidirectional counter having:
(1) a first input terminal connected to said determining means of said entrance station;
(2) a second input terminal connected to a presence detector of said second storage device;

(3) an output terminal whereat an indication of the occupancy of said first storage device is provided; and, a logical gate, said logical gate having a first input terminal connected to said output terminal of said bidirectional counter associated with said first storage device and a second input terminal connected to an output terminal of a bidirectional logical gate further having an output terminal connected to means for effecting operation of one of said plurality of first transfer means provided between said first and second storage devices.

5. The apparatus of claim 1, further comprising:

a bidirectional counter for providing an indication of the number of storage devices currently being utilized, said bidirectional counter having:
(1) an incrementing count input terminal connected to said determining means of said entrance station;
(2) a decrementing count input terminal connected to receive a signal when a set of sheets is forwarded to said processing station; and,
(3) an output terminal connected to said entrance station whereby feeding from said entrance station is stopped while the contents of said bidirectional counter equals the number of said storage devices arranged between said entrance station and said processing station.

6. A method of assembling sets of sheets and for forwarding assembled sets of sheets to a processing station at a predetermined cycle frequency, said method comprising the steps of:

providing an entrance station including a receiving station wherein individual form sheets are received;

arranging at least three storage devices in serial fashion in a direction of travel of said sets from said entrance station to said processing station;

feeding individual form sheets from said receiving station of said entrance station to a first of said storage devices;

determining when all related form sheets belonging to a set of sheets has been fed from said entrance station into said first storage device;

collecting related ones of said form sheets in a set of form sheets at said first storage device;

providing means for transferring sets of forms between adjacent storage devices, and between a last storage device and said processing station;

transferring said assembled sheets toward said processing station using said transfer means provided at least partially between adjacent storage devices by independently and intermittently controlling each of said transfer means in a manner whereby a given transfer means is operated only when (1) the storage device which precedes said given transfer means is occupied by a set of sheets, and (2) the storage device which succeeds said given transfer means can receive a set of sheets; and, transferring sets of sheets from said last storage device to said processing station.

7. The method of claim 6, wherein said step of transferring sets of sheets from said last storage device comprises the step of:

independently operating said transfer means disposed between said last storage device and said processing station in a manner whereby said transfer means is operated when (1) said last storage device is occupied by a set of sheets, and (2) said processing station can receive a set of sheets.

8. The method of claim 6, further comprising the steps of:

incrementing a counter whenever said entrance station feeds all sheets belonging to a set of sheets to said first storage device;

decrementing a counter whenever a set of sheets is transferred from said last storage device to said processing station; and, stopping the delivery of sheets from said entrance device while the contents of said counter equals the number of storage devices serially arranged between said entrance station and said processing station.

* * * * *